US00RE35237E

United States Patent [19]

Gunnerman

[11] E Patent Number: Re. 35,237

[45] Reissued Date of Patent: May 14, 1996

[54] AQUEOUS FUEL FOR INTERNAL COMBUSTION ENGINE AND METHOD OF COMBUSTION

[76] Inventor: Rudolf W. Gunnerman, 210 Gentry Way, Reno, Nev. 89502

[21] Appl. No.: 326,610

[22] Filed: Oct. 20, 1994

Related U.S. Patent Documents

Reissue of:

[64] Patent No.: 5,156,114
Issued: Oct. 20, 1992
Appl. No.: 695,304
Filed: May 3, 1991

U.S. Applications:

[63] Continuation-in-part of Ser. No. 689,988, Apr. 3, 1991, abandoned, which is a continuation-in-part of Ser. No. 440,224, Nov. 2, 1989, abandoned.

[51] Int. Cl.[6] ..... F02P 23/02; F02M 31/04; C10L 1/02

[52] U.S. Cl. ..... 123/1 A; 123/143 B; 123/556; 123/DIG. 12

[58] Field of Search ..... 123/1 A, 3, 25 R, 123/25 E, 143 B, 556, 25 A, 25 B, 25 F, DIG. 12, 670; 44/301; 431/4

[56] References Cited

U.S. PATENT DOCUMENTS

| | | | |
|---|---|---|---|
| 1,379,077 | 5/1921 | Blumenberg, Jr. | 123/537 |
| 1,926,071 | 9/1933 | Vance | 44/301 |
| 2,006,676 | 7/1935 | Garrett | 204/228 |
| 2,460,700 | 2/1949 | Lyons | 123/1 A |
| 2,656,830 | 10/1953 | Houdry | 123/670 |
| 2,671,311 | 3/1954 | Rohrbach | 123/25 R |
| 2,724,698 | 11/1955 | Kittleson | 252/49.6 |
| 2,920,948 | 1/1960 | Weeks | 44/301 |
| 3,037,056 | 5/1962 | Lowe et al. | 564/208 |
| 3,208,441 | 9/1965 | Ottofy | 123/552 |
| 3,233,986 | 2/1966 | Morehouse | 44/320 |
| 3,490,237 | 1/1970 | Lissant | 60/217 |
| 3,556,976 | 1/1971 | Ishibashi | 422/186.28 |
| 3,606,868 | 9/1971 | Voogd | 123/25 R |
| 3,749,318 | 7/1973 | Cottell | 239/1 |
| 4,011,843 | 3/1977 | Feuerman | 123/537 |
| 4,048,963 | 9/1977 | Cottell | 123/25 R |
| 4,084,940 | 4/1978 | Lissant | 44/301 |
| 4,088,450 | 5/1978 | Kosaka et al. | 422/201 |
| 4,110,973 | 9/1978 | Haeflich et al. | 60/39.05 |
| 4,133,847 | 1/1979 | Feuerman | 261/18.2 |
| 4,158,551 | 6/1979 | Feuerman | 44/301 |
| 4,170,200 | 10/1979 | Takeuchi et al. | 123/3 |
| 4,185,593 | 1/1980 | McClure | 123/1 A |
| 4,202,670 | 5/1980 | Tateishi | 44/282 |
| 4,227,817 | 10/1980 | Gerry | 366/127 |
| 4,230,072 | 10/1980 | Noguchi et al. | 123/1 A |
| 4,242,076 | 12/1980 | Rawyler-Ehrat | 431/4 |

(List continued on next page.)

FOREIGN PATENT DOCUMENTS

| | | | |
|---|---|---|---|
| 0025298 | 3/1981 | European Pat. Off. . | |
| 0072676 | 2/1983 | European Pat. Off. . | |
| 0095823 | 12/1983 | European Pat. Off. . | |
| 0372353 | 6/1990 | European Pat. Off. . | |
| 0475620 | 3/1992 | European Pat. Off. . | |
| 2421940 | 11/1979 | France | 44/301 |
| 52-69908 | 6/1977 | Japan | 44/301 |
| 54-000234 | 1/1979 | Japan . | |
| 54-10308 | 1/1979 | Japan | 44/301 |
| 56-11965 | 1/1981 | Japan . | |
| 57-145181 | 9/1982 | Japan . | |
| 01-149737 | 6/1989 | Japan . | |
| 01-252697 | 10/1989 | Japan . | |
| 241859 | 5/1983 | Poland . | |
| 125046 | 9/1985 | Poland . | |
| 213946 | 9/1923 | United Kingdom . | |
| 205582 | 10/1923 | United Kingdom . | |
| 669037 | 3/1952 | United Kingdom . | |
| 2019405 | 10/1979 | United Kingdom . | |
| WO812024 | 7/1981 | WIPO . | |
| WO804311 | 6/1988 | WIPO . | |
| WO910951 | 11/1989 | WIPO . | |

OTHER PUBLICATIONS

F. A. Cotton, et al., *Advanced Inorganic Chemistry,* 4th edition, pp. 215–228 (undated).

E. B. Millard, *Physical Chemistry For Colleges,* 1941, pp. 340–344.

M. Venugopalan and R. A. Jones, *Chemistry of Dissociated Water Vapor and Related Systems,* 1968, p. 187.

Gunnerman Motor Corporation, "Ultra Low Emission Internal Combustion Engine Powered Vehicles" (four pages), (undated).

*Daily Times,* Salisbury, Maryland, "Environmental Decade's Answer to Henry Ford," Dec. 27, 1990, p. 18.

*Oil Market Listener,* Jan. 22, 1993, "Further Tests Lend Credence to Significant Potential of Water–Gasoline Fuel" pp. 1–5.

E. J. Smith, XPCI Corporation, SAE International Congress, Paper No. 830385 SAE Spec. Publ. N.SP–54237–42, "The Use of Surfactants in Preventing Phase Separation of Alcohol Petroleum Fuel Mixtures", 1983.

*Primary Examiner*—Tony M. Argenbright
*Attorney, Agent, or Firm*—Christie, Parker & Hale

[57] ABSTRACT

An aqueous fuel for an internal combustion engine is provided. The fuel comprises water from about 20 percent to about 80 percent by volume of the total volume of said fuel, and a carbonaceous fuel selected from the class consisting of ethanol, methanol, gasoline, kerosene fuel, diesel fuel, carbon-containing gaseous or liquid fuel, or mixtures thereof. A method for combusting an aqueous fuel in an internal combustion engine is provided. The method produces approximately as much power as the same volume of gasoline. The method comprises introducing air and aqueous fuel into a fuel introduction system for the engine. The fuel comprises water from about 20 percent to about 80 percent by volume of the total volume of the fuel, and a carbonaceous fuel from ethanol, methanol, gasoline, kerosene fuel, diesel fuel, carbon-containing gaseous or liquid fuel, or mixtures thereof, and introducing and combusting said air/fuel mixture in a combustion chamber or chambers in the presence of a hydrogen producing catalyst to operate the engine.

117 Claims, No Drawings

U.S. PATENT DOCUMENTS

| | | | |
|---|---|---|---|
| 4,244,328 | 1/1981 | Lindstrom | 123/3 |
| 4,246,082 | 1/1981 | Feuerman | 204/136 |
| 4,266,943 | 5/1981 | Lo | 44/301 |
| 4,276,131 | 6/1981 | Feuerman | 204/129 |
| 4,295,859 | 10/1981 | Boehmke | 44/301 |
| 4,297,107 | 10/1981 | Boehmke | 44/301 |
| 4,333,739 | 6/1982 | Neves | 44/308 |
| 4,369,043 | 1/1983 | Han | 44/313 |
| 4,382,802 | 5/1983 | Beinke et al. | 44/301 |
| 4,385,593 | 5/1983 | Brooks | 123/1 A |
| 4,392,865 | 7/1983 | Grosse et al. | 44/281 |
| 4,418,654 | 12/1983 | Keiun | 123/25 A |
| 4,476,817 | 10/1984 | Lindberg | 123/3 |
| 4,477,258 | 10/1984 | Lepain | 44/302 |
| 4,563,982 | 1/1986 | Pischinger et al. | 123/1 A |
| 4,565,548 | 1/1986 | Davis et al. | 44/302 |
| 4,594,991 | 6/1986 | Harvey | 123/557 |
| 4,597,671 | 7/1986 | Marelli | 366/127 |
| 4,732,576 | 3/1988 | Friedrick et al. | 44/301 |
| 4,744,796 | 5/1988 | Hazbun | 44/302 |
| 4,793,826 | 12/1988 | Hayes et al. | 44/301 |
| 4,818,251 | 4/1989 | Easton et al. | 44/320 |
| 4,831,971 | 5/1989 | Ott et al. | 123/25 A |
| 4,842,616 | 6/1989 | Verhille | 44/281 |
| 4,907,368 | 3/1990 | Mullay et al. | 44/301 |
| 4,923,483 | 5/1990 | Layrisse et al. | 44/301 |
| 4,925,385 | 5/1990 | McCord, Jr. | 431/2 |
| 4,976,745 | 12/1990 | Rodriguez et al. | 44/301 |
| 4,978,365 | 12/1990 | Gregoli et al. | 44/301 |
| 5,156,114 | 10/1992 | Gunnerman | 123/1 A |
| 5,156,652 | 10/1992 | Gregoli et al. | 44/302 |
| 5,284,492 | 2/1994 | Dubin | 44/301 |
| 5,308,610 | 5/1994 | Bauman | 424/76.5 |
| 5,344,306 | 9/1994 | Brown et al. | 431/4 |

AQUEOUS FUEL FOR INTERNAL COMBUSTION ENGINE AND METHOD OF COMBUSTION

Matter enclosed in heavy brackets [ ] appears in the original patent but forms no part of this reissue specification; matter printed in italics indicates the additions made by reissue.

CROSS REFERENCE TO CO-PENDING APPLICATIONS

This application is a continuation in part patent application Ser. No. 07/689,988, filed Apr. 3, 1991, now abandoned, which is a continuation in part of application Ser. No. 07/440,224, filed Nov. 2, 1989, *abandoned,* and related to application Ser. No. 07/714,683, filed Jun. 13, 1991.

FIELD OF THE INVENTION

This invention relates to a novel aqueous fuel for an internal combustion engine and to a novel method of combusting such fuel in an internal combustion engine as well as to a novel fuel mixture which results from the introduction of the aqueous fuel into the combustion chamber of an internal combustion chamber in the presence of a hydrogen-producing catalyst.

BACKGROUND OF THE INVENTION

There is a need for new fuels to replace diesel and gasoline for use in internal combustion engines, especially engines used in motor vehicles. Internal combustion engines operating on gasoline and diesel fuel produce unacceptably high amounts of pollutants which are injurious to human health and may damage the earth's atmosphere. The adverse effects of such pollutants upon health and the atmosphere have been the subject of great public discussion. Undesirable pollutants result from combustion of carbonaceous fuel with combustion air that contains nitrogen. The relatively large amounts of air used to combust conventional fuels is therefore, a primary reason for unsatisfactory levels of pollutants emitted by vehicles with internal combustion engines.

SUMMARY OF THE INVENTION

A novel fuel and fuel mixture, and novel method of combustion, have been discovered which will reduce pollutants produced by internal combustion engines operated with conventional carbonaceous fuels such as gasoline, diesel fuel, kerosene fuels, alcohol fuels such as ethanol and methanol, and mixtures thereof. The new fuel mixture is also much less expensive than carbonaceous fuel such as gasoline or diesel fuel because its primary ingredient is water. The term "internal combustion engine" as used herein is intended to refer to and encompass any engine in which carbonaceous fuel is combusted with oxygen in one or more combustion chambers of the engine. Presently known such engines include piston displacement engines, rotary engines and turbine (jet) engines.

The novel aqueous fuel of the present invention has less than the potential energy of carbonaceous fuels but is nonetheless capable of developing at least as much power. For example, an aqueous fuel of the invention comprising water and gasoline has about ⅓ the potential energy (BTU's) of gasoline, but when used to operate an internal combustion engine, it Will produce approximately as much power as compared with the same amount of gasoline. This is indeed surprising and is believed to be due to the novel fuel mixture that results from the release of hydrogen and oxygen and the combustion of hydrogen when the novel aqueous fuel is introduced to a combustion chamber of an internal combustion engine and combusted with relatively small amounts of combustion air in the presence of a hydrogen-producing catalyst by the novel method of the present invention.

In its broadest aspects, the aqueous fuel of the present invention comprises substantial amounts of water, e.g., up to about 70 to about 80 percent by volume of the total volume of aqueous fuel, and a gaseous or liquid carbonaceous fuel such as gasoline, ethanol, methanol, diesel fuel, kerosene-type fuel, other carbon-containing fuels, such as butane, natural gas, etc., or mixtures thereof. In utilizing this fuel with the novel method of the present invention, aqueous fuel and combustion air are introduced into the engine's fuel introduction system, for receiving and mixing fuel and combustion air and introducing the fuel/air mixture into the combustion chamber(s). Such systems may include a conventional carburetor or fuel injection system. Although it is not necessary for the practice of the invention, when using an engine with a carburetor, the combustion air may be preheated to from about 350° F. to about 400° F. as it enters the carburetor. When using an engine with a fuel injection system, the combustion air may be preheated from about 122° F. to about 158° F. as it enters the fuel injection system. The air/fuel mixture is introduced into the combustion chamber or chambers and combusted in the presence of a hydrogen-producing catalyst which facilitates the dissociation of water in the aqueous fuel into hydrogen and oxygen so that the hydrogen is combusted with the carbonaceous fuel to operate the engine.

The term "hydrogen-producing catalyst" is used herein in its broadest sense. A catalyst as generally defined is a substance that causes or accelerates activity between two or more forces without itself being affected. In the present invention it is known that without this substance present in the combustion chamber, as described herein, combustion of the aqueous fuel does not take place in such a way as to produce the desired degree of power to operate the internal combustion engine.

Without intending to be bound by theory, it is believed that upon generation of an electric spark in a combustion chamber with a wet atmosphere in the presence of poles formed of hydrogen-producing catalyst, the electrical discharge electrifies the mass of water present in liquid or gaseous form, e.g., steam vapor, to enable the electric charge to travel to the negatively charged catalytic poles to effect discharge of the electric charge. Dissociation of water molecules appears to occur upon exposure of the mass of water molecules to the electric charge in combination with the heat of combustion resulting from combustion of the carbonaceous material component of the aqueous fuel during the compression stroke which, along with combustion of released hydrogen, provides the power to operate the engine.

Although in the presently preferred embodiment it is preferred to use two catalytic poles of hydrogen-producing catalyst, one, or more than two poles, also may be used to disperse the electric charge. In addition, although the normal spark of standard motor vehicle spark plug systems generating about 25000 to 28000 volts may be used, it is presently preferred to generate a hotter spark, e.g., generated by about 35000 volts. Electric spark generating systems are available of up to 90000 volts and it appears that higher voltages result in better dissociation of water molecules in the combustion chamber.

DETAILED DESCRIPTION OF THE PREFERRED EMBODIMENT

As indicated previously, one of the advantages of the invention is that internal combustion engines may be operated with novel fuels and fuel mixtures that require significantly less combustion air for combustion of the fuel in the engine's combustion chamber. For example, gasoline used as fuel for an internal combustion engine employing a carburetor generally requires an air to fuel ratio of 14 to 16 1 to produce satisfactory power output to operate the engine and power a motor vehicle. Alcohol, such as pure ethanol, may utilize an air to fuel ratio of 8 or 9:1 for satisfactory performance of the same engine. In contrast to such conventional fuels, the aqueous fuel of the present invention utilizes a lesser, controlled amount of combustion air. It has been determined that it is critical for the practice of the invention to employ an air to fuel ratio of not greater than 5:1 for equivalent satisfactory performance of an internal combustion engine. The preferred air to fuel ratio in accordance with the invention is from 0.5:1 to about 2:1; with an optimum air to fuel ratio in the range of 0.5:1 to 1.5:1 and, most optimally 1:1.

The reason that the aqueous fuel and the fuel mixture of the present invention can produce satisfactory internal combustion engine results is that in practicing the invention hydrogen and oxygen are released in the combustion chamber. The hydrogen and oxygen result from dissociation of water molecules and the hydrogen is combusted along with the carbonaceous fuel of the aqueous mixture. The result is that comparable engine power output is achieved with less carbonaceous fuel and less combustion air than can be achieved using conventional combustion of the same carbonaceous fuel with greater amounts of combustion air.

It is further noted that with the aqueous fuel of the present invention the water component vaporizes as steam in the combustion chamber. Steam expands to a greater extent than air and the combustion chamber can be suitably filled with less combustion air. Thus, the water component of the fuel transforms to steam which expands in the combustion chamber and replaces a portion of the combustion air used in combusting conventional fuels in the engine's combustion chamber. The expansion of the steam together with the combustion of the hydrogen released by dissociation of the water molecules results in generation of the required power output necessary for satisfactory operation of the engine.

It has been previously pointed out, that the amount of combustion air provided in the combustion chamber for combustion with the aqueous fuel of the invention must be critically controlled so that an air to fuel ratio of not greater than 5:1 is present during combustion. It has been determined that if too much air, i.e., greater than a ratio of air to fuel of 5:1, is introduced with the aqueous fuel into the combustion chamber, incomplete combustion of the carbonaceous fuel results because of the excess of oxygen in the combustion chamber. Excess oxygen over that required to combust the carbonaceous fuel results when the ratio of air to fuel is too high due to a combination of the amount of oxygen released from dissociation of the water molecules and the additional oxygen present in an excessive amount of combustion air. Incomplete combustion of the carbonaceous fuel results in unsatisfactory performance of the engine as well as excess emission of undesirable pollutants. By reducing the amount of combustion air required for combustion in the combustion chamber, less nitrogen is present in the combustion chamber to combine with oxygen and form undesirable NOX pollutants emitted during engine operation. Thus, one important advantage of the invention is the considerable reduction in NOX and other undesirable emission pollutants over that which are produced by conventionally operated internal combustion engines using conventional carbonaceous fuels such as gasoline, diesel fuel, etc. in internal combustion engines.

It is also noted that since hydrogen and oxygen and oxygen are present in the fuel mixture to be combusted in the combustion chamber of an internal combustion engine, in accordance with the invention, circumstances may arise in which too little water in the aqueous fuel would be unsatisfactory. For example, where the carbonaceous fuel has a low inherent energy output, i.e. low potential energy of BTU output per unit volume, greater amounts of water may be desirable because the release of hydrogen and oxygen by dissociation of water molecules and combustion of the hydrogen will usefully increase the total energy output of the carbonaceous fuel and water mixture. For this reason, a lower limit of between 20 and 25% water, e.g., greater than 20% water, is established as the useful, practical, minimum amount of water in the aqueous fuel mixture of the present invention so as to accommodate a greater variety of carbonaceous fuels within the scope of the invention. The upper limit of 70% to 80% water is established because a minimum amount of gaseous or liquid carbonaceous fuel is need to initiate the reaction, triggered by a spark generated in the combustion chamber that dissociates the water molecules in the combustion chamber. It has been determined that from 30,000 BTU energy/gal. of fuel to 60,000 BTU energy/gal. of fuel is preferred for the water dissociation reaction.

The aqueous fuel of the present invention comprises water from greater than about 20 percent to about 70 to 80 percent by volume of the total volume of the aqueous fuel and, preferably, a volatile liquid carbonaceous fuel, such as a fuel selected from the group consisting of alcohols, e.g., ethanol or methanol, gasoline, diesel fuel, kerosene-type fuel, or mixtures thereof. Alcohols such as ethanol and methanol generally contain small percentages of water when produced commercially and, of course, include oxygen and hydrogen in the molecular structure. Commercial grades of ethanol and methanol are marketed in terms of a proof number, such as for example, 100 proof ethanol. One half the proof number is generally an indication of the amount of ethanol present, i.e., 100 proof ethanol contains 50 vol percent ethyl alcohol and 50 percent water; 180 proof ethanol contains 90 percent of ethyl alcohol and 10 percent of water, etc.

The aqueous fuel of the present invention is believed to be usable in all internal combustion engines, including conventional gasoline or diesel powered internal combustion engines for use in automobiles, trucks and the like, using conventional carburetors or fuel injection systems as well as rotary engines and turbine (jet) engines. The invention is believed to be useable in any engine in which volatile liquid carbonaceous fuel is combusted with oxygen ($O_2$) in one or more combustion chambers of the engine.

Few modifications are necessary to make such engines usable with the fuel of the present invention. For example, installation of a hydrogen-producing catalyst in the combustion chamber or chambers of the engine, such as described elsewhere herein, to act as a catalyst in the dissociation of water molecules to yield hydrogen and oxygen must be made. In addition, suitable means to supply and control the input, quantity and flow, of combustion air and fuel to the combustion chamber(s) is important for optimum engine operation. It is noted in this regard that the air:fuel ratio is a significant factor in effecting combustion in the chamber(s). It is also desirable, from a practical point of view, to make the fuel supply and fuel storage systems of rust proof materials. A higher voltage electric spark system than generally used in internal combustion engines of motor vehicles operated with conventional carbonaceous fuels, e.g., gasoline, is also preferred. Systems to provide a "hotter spark" are available commercially, such as from Chrysler Motor Company. As a further modification to optimize use of the invention, it is desirable to employ a computer assisted electronically controlled system to supply fuel to fuel injectors during the intake stroke of the internal combustion engine.

The dissociation of water molecules, per se, is well known. For example, the thermo-dynamics and physical chemistry of water/steam dissociation are described in the text entitled "Chemistry of Dissociated Water Vapor and Related Systems" by M. Vinugopalan and R.A. Jones, 1968, published by John Wiley & Sons, Inc.; "Physical Chemistry for Colleges", by E.B. Mellard, 1941, pp 340–344 published by McGraw-Hill Book Company, Inc., and "Advanced Inorganic Chemistry", by F. Albert Cotton and Geoffrey Wilkinson, 1980, pp 215–228; the disclosures of which are expressly incorporated herein by reference.

Although not required for the practice of the invention, a heater to preheat the combustion air for the engine and a heat exchanger to use the hot exhaust gases from the engine to preheat the combustion air after the engine is operating, at which time the heater is shut off, may also be installed. Although the presently preferred embodiment of the invention does not require preheating combustion air and/or fuel, combustion air for the engine may be preheated before it is introduced into a carburetor or fuel injection system. When using an engine with a carburetor, the combustion air may be preheated to from about 350° F. to about 400° F. as it enters the carburetor. When using an engine with a fuel injection system, the combustion air may be preheated from about 122° F. to about 158° F. as it enters the fuel injection system. In such cases, the aqueous fuel of the present invention is introduced into the carburetor or fuel injection system and is mixed with a controlled amount of combustion air. The aqueous fuel is preferably introduced into the carburetor or fuel injection system at ambient temperatures.

In the preferred embodiment, introduced into the carburetor or fuel injection system at ambient temperatures and the air/fuel mixture is then introduced into the combustion chamber or chambers where a spark from a spark plug ignites the air/fuel mixture in the conventional manner when the piston of the combustion chamber reaches the combustion stage of the combustion cycle. The presence of a hydrogen-producing catalyst in the combustion chamber is believed to act as a catalyst for the dissociation of water molecules in the aqueous fuel when the spark plug ignites the air/fuel mixture. The hydrogen and oxygen released by dissociation are also ignited during combustion to increase the amount of energy delivered by the fuel. It has been observed in experiments using 100 proof alcohol as the engine fuel that the engine produced the same power output, i.e., watts per hour, as is produced with the same volume of gasoline. This is indeed surprising in view of the fact that the 100 proof ethanol has a theoretical energy potential of about 48,000 BTU's per gallon, with a usable potential of about 35,000 to 37,500 BTU's per gallon, as compared to gasoline, which has an energy potential of about 123,000 BTU's per gallon, nearly three times as much. The fact that the lower BTU ethanol is able to generate as much power as a higher BTU gasoline suggests that additional power is attributable to the liberation, i.e., dissociation and combustion of hydrogen and oxygen from the water.

Inasmuch as 100 proof ethanol has been found to be a satisfactory fuel in using the method of the present invention, it is apparent that other suitable fuels may be made by blending by use of other alcohols and by blending alcohols with gasoline, kerosene type fuels or diesel fuel, depending on whether the fuel is to be used in a gasoline, turbine or diesel powered engine. Experimental work also indicates that 84 proof (42 percent water) ethanol may also be used as a fuel and it is believed that aqueous fuels containing as much 70 to 80 percent water may be used.

THE ENGINE WITH CARBURETOR

To demonstrate one embodiment of the present invention, an engine was selected which also had the capacity to measure a predetermined workload. The engine selected was a one-cylinder, eight horsepower internal combustion engine connected to a 4,000 watt per hour a/c generator. The engine/generator was manufactured by the Generac Corporation of Waukesha, Wisconsin under the trade name Generac, Model No. 8905-0(S4002). The engine/generator is rated to have a maximum continuous a/c power capacity of 4,000 watts (4.0 KW) single phase. The engine specifications are as follows:

Engine Manufacturer—Tecumseh

Manufacturer's Model No.—HM80 (Type 155305-H)

Rated Horsepower—8 at 3600 rpm

Displaoement—19.4 cubic inches (318.3 cc)

Cylinder Block Material—Aluminum with cast iron sleeve

Type of Governor—Mechanical, Fixed Speed

Governed Speed Setting—3720 rpm at No-Load (Rated a/c frequency and voltage (120/240 volts at 62 hertz) are obtained at 3600 rpm. The no-load setting of 3720 rpm provides 124/248 volts at 62 hertz. A slightly high no-load setting helps ensure that engine speed, voltage and frequency do not drop excessively under heavier electrical loading.)

Type of Air Cleaner—Pleated Paper Element

Type of Starter—Manual, Recoil Rope

Exhaust Muffler—Spark Arrestor Type

Ignition System—Solid State with Flywheel Magneto

Spark Plug—Champion RJ-17LM (or equivalent)

Set Spark Plug Gap to—0.030 inch (0.76 mm)

Spark Plug Torque—15 foot-pounds

Crankcase Oil Capacity—1 ½ pints (24 ounces)

Recommended Oil—Use oil classified "For Service SC, SD or SE"

Primary Recommended Oil—SE IOW-30 Multiple Viscosity Oil

Acceptable Substitute—SAE 30 Oil

Fuel Tank Capacity—1 gallon

Recommended Fuel—

Primary—Clean, Fresh UNLEADED Gasoline

Acceptable Substitute—Clean, Fresh, Leaded REGULAR Gasoline

A heat exchanger was installed on the engine to use the hot exhaust gases from the engine to preheat the air for combustion. A platinum bar was installed at the bottom surface of the engine head forming the top of the combustion chamber. The platinum bar weighed one ounce and measured 2-5/16 inches in length, ¾ inches in width, and 1/16 inch in thickness. The platinum bar was secured to the inside of the head with three stainless steel screws.

A second fuel tank having a capacity of two liters was secured to the existing one-liter fuel tank. A T-coupling was inserted into the existing fuel line of the motor for communication with the fuel line for each fuel tank. A valve was inserted between the T-coupling and the fuel lines for each fuel tank so that either tank could be used separately to feed fuel to the carburetor or to mix fuels in the fuel line leading to the carburetor.

TEST RUNS

A series of tests were performed to determine if 100 proof ethanol (50% ethanol by volume, balance water) could be used in the motor which was modified as described above, and if so, to compare the performance of the 100 proof ethanol with the same amount of gasoline.

Two liters of unleaded gasoline were poured into the second fuel tank with the valve for the second tank in the closed position. Three and eight tenths liters of 100 proof ethanol were poured into the one gallon fuel tank with the valve in the closed position. The valve for the gasoline tank was opened so that the engine could be initially started on gasoline.

Within three minutes of starting the motor, the combustion air entering into the carburetor was measured at 180° F. At this point, the fuel valve under the ethanol tank was opened and the valve under the gasoline tank was closed. At that point, the temperature of the air entering the carburetor had risen to 200° F.

Ethanol was now the primary fuel in the motor which exhibited a certain amount of roughness during operation until the choke mechanism was adjusted by reducing the air intake to the engine by approximately 90 percent. Immediately thereafter, two, 1800 watt, heat guns, having a rated heat output of 400° F, were actuated and used to heat the combustion air as it entered the carburetor. The temperature of the air from the heat guns measured 390° to 395° F.

After the engine ran on ethanol for approximately 20 minutes, the heat measurement in the incoming combustion air stabilized between 347° F. and 352° F. The engine was run on the 100 proof ethanol fuel for 40 additional minutes, for a total of one hour, until two liters of ethanol had been used. The valve under the ethanol tank was then closed and the engine was turned off by opening the choke. Eighteen hundred milliliters of ethanol were left remaining in the tank.

The choke was then reset to the 90 percent closed position, and the engine was started once again. The engine responded immediately and ran as smoothly on 100 proof ethanol as it did during the one-hour operation.

The engine was stopped and started in the same manner on three separate occasions thereafter with the same results.

While operating the engine on 100 proof ethanol. the power output on the generator was measured and indicated that the ethanol produced 36,000 watts of power during a one-hour period using two liters of ethanol having energy potential of about 48,000 BTUs per gallon.

After the engine had stopped running on ethanol, it was operated again with the two liters of gasoline in the gasoline tank. Forty seven minutes into the test, the engine stopped because it ran out of gasoline. Measurements taken on the generator indicated that, when the engine was operated on gasoline, it was producing power at a rate of 36,000 watts per hour for 47 minutes, using two liters of gasoline having an energy potential of about 123,000 BTUs per gallon.

Comparing these power measurements indicates that two liters of 100 proof ethanol produced the same amount of power as two liters of gasoline. This is surprising inasmuch as the gasoline has about 2.5 times as many BTUs as the same amount of 100 proof ethanol. This indicates that the extra power from the ethanol must be due to the liberation and combustion of hydrogen and oxygen from the relatively large amounts of water in the fuel.

Although gasoline was used as the starter fuel to preheat the engine and, thus, generate hot exhaust gases to preheat the combustion air, the use of the gasoline as the starter fuel for preheating is not necessary and could be replaced with an electrical heat pump to preheat the combustion air until the heat exchanger can take over and preheat the combustion air, whereupon the electrical heat pump would turn off.

The above tests comparing the use of the 100 proof ethanol and gasoline were repeated on three subsequent occasions, each with the same results.

A second series of tests were run which were identical to the above, except for the use of 84 proof ethanol (42 percent ethyl alcohol and 58 percent water) in place of the 100 proof ethanol. However, after running about 30 seconds on the 84 proof ethanol, the engine stopped abruptly and released a fair amount of oil under high pressure from the main bearing in the main engine. The engine was restarted and abruptly stopped again after operating for about 20 seconds.

The above stoppage appears to have been due to preignition of the hydrogen and/or oxygen during the up-stroke period of the piston which caused pressure build-up in the crank case, which in turn forced oil under pressure through the main bearing. The pressure inside the combustion chamber appears to have been relieved through the piston rings into the crank case, and then relieved through the main bearing.

The premature ignition of the hydrogen and/or oxygen was probably caused by generating a larger amount of oxygen and hydrogen which did not occur when using 100 proof ethanol having a lesser amount of water.

The preignition problem is believed to be curable by using an engine having a shorter piston stroke to reduce the dwell time of the fuel, including hydrogen and oxygen, in the combustion chamber, or by adjusting the carburetor or the electronically controlled fuel injection system to help reducing dwell time to avoid generating excessive amount of hydrogen and oxygen. The engine used in the experiment had a relatively long piston stroke of 6 inches. For the conditions described above, the piston stroke should be no more than about 1 ½ inches or less to avoid the preignition problem in that particular engine.

ENGINE WITH ELECTRONICALLY CONTROLLED FUEL INJECTION SYSTEM

A series of tests were run on an engine having an electronically controlled fuel injection system to determine if that would solve the preignition problem discussed above. The engine used for this purpose was a 3-cylinder turbo charge electronically controlled internal combustion engine from a 1987 Chevrolet Sprint which had been driven about 37,000 miles.

The head was removed from the motor block and cleaned to remove carbon deposits. Three platinum plates were attached to the inside of each head so as not to interfere with valves moving inside the heads during operation. Each platinum plate was 1 centimeter in length and width and was 1/32 of an inch in thickness. Each platinum plate was attached to a head with one stainless steel screw through the center of each piece. Carbon deposits were cleaned off each piston head and the engine was reassembled using new gaskets.

The combustion air intake hose which exits from the turbo and leads to the injector module was divided in the middle and attached to a heat exchanger to cool the combustion air delivered to the injector. The heat exchanger was bypassed by using two Y-junctions on either side of the heat exchanger and by putting a butterfly valve on the side closest to the turbo so that the hot air stream could be diverted around the heat exchanger and introduced directly into the injector module. All pollution abatement equipment was removed from the engine but the alternator was kept in place. The transmission was reattached to the engine because the starter mount is attached to the transmission. The transmission was not used during the testing. This engine was inserted into a Chevrolet Sprint car having a tailpipe and muffler system so that the engine was able to run properly. The catalytic converter was left in the exhaust train but the inside of the converter was removed as it was not needed. Two one-gallon plastic fuel tanks were hooked up to the fuel pump by a T-section having manual valves so the fuel to the fuel pumped could be quickly changed by opening or closing the valves.

TEST RUNS

A series of test runs were performed to determine how the engine as modified above would run using a variety of fuels.

The first test utilized 200 proof methanol as a starter fluid. The engine started and operated when the fuel pressure was raised to 60 to 75 lbs. When using gasoline, the fuel pressure is generally set at 3.5 to 5 lbs.

While the engine was running on the 200 proof methanol, the fuel was changed to 100 proof denatured ethanol and the motor continued operating smoothly at 3500 revolutions per minute (rpm). After about two minutes the test was stopped and the engine shut down because the fuel hoses were bulging and became unsafe. These hoses were replaced with high pressure hoses and the plastic couplings and the T's were also replaced with copper couplings and T's. A new pressure gage was attached. During the testing, it was noted that the fuel mixture needed more combustion air and that the computerized settings of the engine could not be adjusted to provide the additional air. To overcome this, the air intake valve was opened.

After these modifications, a new series of tests were performed using 200 proof methanol in one of two fuel tanks. The engine started on the 200 proof methanol and the rpm setting was adjusted to 3500. The engine was allowed to run for a few minutes. During that time, the fuel pressure was adjusted and it was noted that 65 lbs. of pressure appeared to be adequate. A thermocouple was inserted close to the injector module and provided a reading of 65° C. after about 5 minutes.

A fuel mixture comprising 500 ml of distilled water and 500 ml of 200 proof methanol were put into the second fuel tank this fuel and was used to operate the engine. Without changing the air flow, the temperature of the combustion air rose from 65° to 75° C. after about 1 minute. The rpm reading dropped to 3100 rpm. The engine ran very smoothly and was turned off and restarted without difficulty.

The next step in the test series was to determine how variations in the water content of the fuel effected engine performance. Using 199 proof denatured ethanol as starter fuel, the engine started immediately. The fuel pressure setting was reduced from 65 lbs. to 50 lbs, the combustion air measured 65° C., the rpm's measured 3500, and the engine ran smoothly.

The fuel was then changed into 160 proof denatured ethanol. The fuel pressure was maintained at 50 lbs. The combustion air temperature was measured at 67° C., the rpm's decreased to 3300, and the engine ran smoothly.

After 10 minutes, the fuel was changed to 140 proof denatured ethanol. The combustion air temperature rose to 70° C., the rpm's rose to 3500, and the engine ran smoothly.

After 10 minutes, the fuel was changed to 120 proof denatured ethanol. The combustion air temperature increased to 73° C., the rpm's decreased to 3300, and the engine ran smoothly.

After 10 minutes, the fuel was changed to 100 proof denatured ethanol. The combustion air temperature increased to 74° C., the rpm's decreased to 3100, and the engine ran smoothly.

After 10 minutes, the fuel was changed to 90 proof denatured ethanol. The combustion air temperature remained at 74° C., the rpm's reduced to 3100, and the engine ran smoothly.

After 10 minutes, the fuel was changed to 80 proof denatured ethanol. The combustion air temperature raised to 76° C. and the rpm's reduced to 2900. At that point, an infrequent backfire was noted in the engine. 100 proof denatured ethanol was then used as the primary fuel and the bypass to the heat exchanger was closed. The combustion air temperature rose to 160° C. and during the next minutes increased to 170° C. The rpm's increased to 4000 rpm and the engine ran smoothly.

Another series of tests were run with the engine adjusted to operate at 3500 rpm's and with the heat exchanger removed so that neither the fuel or combustion air were preheated and thus were at ambient temperatures. The engine was started with 200 proof ethanol as the fuel and as soon as the intake air temperature at the injector module had risen to about 50° C., the fuel was changed to 100 proof ethanol and the engine ran smoothly. The intake air temperature rose to 70° C. where it stabilized. The engine was turned off, restarted and continued to run smoothly. By adjusting and opening the air intake, the rpm could be increased to over 4000. By slightly closing the same air intake, the rpm could be reduced to 1500. At both ranges of rpm, the engine ran smoothly and was turned off and restarted without difficulty and continued to run smoothly.

The rpm of an engine using the method and fuel of the present invention may be regulated by regulating the amount of air flow into the combustion chamber. In a conventional gasoline powered engine, the engine rpm is regulated by regulating the amount of gasoline that is introduced into the combustion chambers.

It is evident that the invention involves the use of an aqueous fuel which may comprise large amounts of water in proportion to volatile carbonaceous fuel. A particularly effective aqueous fuel comprises a mixture of approximately 70% water and 30% carbonaceous fuel. The thermal energy of the carbonaceous fuel, e.g., gasoline, is reduced from the fuels high energy value, approximately 120,000 BTU's per volume gallon in the case of gasoline, to a BTU content of approximately 35,000 BTU's per volume gallon for the 70% water, 30% gasoline mixture. This BTU content of the water/gasoline mixture is sufficient to maintain a reaction in the combustion chamber of an internal combustion engine, such that the water molecule is dissociated and the hydrogen molecule ($H_2$) is separated from the oxygen molecule ($O_2$)

and the so produced hydrogen gas is utilized as a primary power source to move the pistons inside an internal combustion engine upon combustion. The invention is applicable with a variety of volatile carbonaceous fuels, including diesel oil or kerosene, and those fuels can be also mixed with up to 80% water (e.g., diesel or kerosene) to achieve the same reaction to dissociate hydrogen and oxygen to release hydrogen gas to power an internal combustion engine in the presence of a hydrogen-producing catalyst.

For this reaction to take effect, it is necessary to equip each combustion cavity inside the internal combustion engine with at least one, but preferably two, and maybe more, poles of hydrogen producing catalyst, with a melting point above the temperature of combustion. Useful catalysts include Ni, Pt, Pt-Ni alloys, Ni-stainless steel, noble metals, Re, W, and alloys thereof, which may be utilized as a hydrogen producing catalyst in the form of catalytic metal poles. Combustion and dissociation is initiated by a spark which may be created by a conventional electric spark generation system such as is used with conventional motor vehicle engines.

As a further examples of the invention, using fuel and combustion air at ambient temperatures I took 3 liters of unleaded gasoline (87 octane) with a BTU content of about 120,000 BTU's per gallon and 7 liters of tap water. I added 10 ml of surfactant (detergent) into this mixture in a first test to enhance mixing of the water with the gasoline. This procedure was followed to produce additional mixtures with 25 ml and 40 ml of surfactant to obtain the water/gasoline mixture. The same procedure was also followed with using tap water which was filtered through a deionization unit and charcoal filter to remove the chlorine and other impurities present in the water.

Each of the above described mixtures was then tested in a 4 cylinder, 2.5 liter internal combustion engine equipped with injectors, which were attached to a fuel rail. The fuel used during those tests was disbursed to the fuel rail through a Bosch multi-port pressure measuring device. The engine was also equipped with a fuel carburetor. The carburetor is only used for the air intake into the engine as the air/fuel ratios are substantially lower and differ with the various fuels used; for example, starting at 0.75:1 with the 50/50 water/alcohol mixture and from 1:1 to 3:1 for the 70% water/30% gasoline mixture. Normally, a gasoline engine using gasoline as fuel utilizes an air fuel ratio of 14 to 1. Such an engine is equipped with a cylinder but is changed to accept two ½ inch diameter nickel bolts or screws, as the hydrogen-producing catalyst, with the screw part being of ¼ inch diameter to practice the invention. The nickel bolts were placed ½ inch apart on top of the piston. In another modification I placed a flat piece of aluminum (6-inches by 12-inches) inside and on top of the engine head. I drilled and tapped three ¾ inch holes into the cover of the engine head in a horizontal position approximately 3 ½ inches apart. I screwed some copper adapters into those holes. The adapters are connected with each other by a ¾ inch copper pipe which was fitted into the muffler. This device carries the exhaust gas from the engine and I have found that it is sufficient to take out water vapors (steam) from the head, otherwise the water vapor will accumulate in the engine and crankcase oil, which is not desirable.

Each of the above mentioned fuel mixtures where tested while the engine was in neutral so as not to move the car and were found to be capable of self starting the engine by just turning the ignition key of the car. It was not necessary to use a secondary fuel to start the engine.

The 2.5 liter engine utilized in those tests was in a standard 2.5 liter Chrysler turbo injection engine with the turbo and all smog and pollution abatement equipment removed. This engine also had a factory installed 3-speed automatic transmission with a gear ratio of 1:3.09.

The same test series as mentioned above was also performed utilizing the same internal combustion engine and car, with approximately from 20% to 25% diesel and 75% to 80% water, with the same results. Additional tests were conducted with from 20% to 25% kerosene fuel and from 75% to 80% water where like results were also obtained.

In another test series, I used a 70% water/30% gasoline emulsified mixture as the only fuel to power the engine in a test "City Car", which I developed for testing purposes. This car is a 4 door, 5 passenger front wheel drive car with a net weight of 2,500 pounds. In tests I was able to drive this car with the above mentioned fuels from 0 to 60 miles per hour in about 6 seconds. I tested the car to a top speed of 75 miles per hour but the car could be driven substantially faster.

As discussed above, I have also determined that it is important to control the air to fuel mixture to obtain optimum results. In one test, I ran a 14:1 air fuel ratio, the same as conventionally used with gasoline, and this resulted in an incomplete combustion within the engine and large amount of water and fuel mixture exiting the tail pipe. The same occurred using an air to fuel mixture of 7:1. These tests were conducted using water and gasoline at a 70% to 30% mixture, water and diesel at a 75% to 25% mixture and water and kerosene at a 75% to 25% mixture. The incomplete combustion began to subside to satisfactory levels with air to fuel ratios of 3:1 or less. Outer limits and optimum properties are easily determined for any given aqueous fuel mixture using the procedure described above but the air to fuel ratio should not exceed 5:1.

I have also found that a wetting agent or surfactant may be desirable. One such agent which has proved to be useful has a trade name of Aqua-mate2 manufactured or distributed by Hydrotex in Dallas, Texas. Obviously, other wetting agents available commercially that help disperse carbonaceous fuels in water are also usable.

I additionally conducted tests on all three above described fuels using 50% water and 50% carbonaceous fuel, e.g., oil based fuel, which was adequately dispersed in the water. These tests also allowed the engine to run very satisfactorily.

Another car test is in progress using 50% water and 50% alcohol, with an energy content of 35,000 BTU's per gallon. Test results of 20 miles per gallon of actual driving have been achieved. With proper fuel management in the engine, efficiency can be effectively increased significantly upwards to 30 miles per gallon or more.

The benefits of the invention are substantial since about a 70% reduction of air pollutants is obtained with a total elimination of NOX. There is also a 70% reduction of the fuel price to drive a vehicle through reduction in the amount of gasoline used. Furthermore, there are other substantial advantages; such as possible reduction of elimination of need for oil imports.

Other gaseous or liquid carbonaceous fuels may be used, including gaseous fuels such as methane, ethane, butane or natural gas and the like which could be, liquified and substituted for ethanol and methanol as used in the present invention, or used in gaseous form.

The present invention could also be used in jet engines, which is another form of internal combustion engine.

While the embodiments of the invention chosen herein for purposes of the disclosure are at present considered to be preferred, it is to be understood that the invention is intended to cover all changes and modifications of all embodiments which fall within the spirit and scope of the invention, wherein what is claimed is:

1. A method for combusting an aqueous fuel in an internal combustion engine having at least one combustion chamber, a fuel introduction system for receiving and mixing fuel and combustion air and introducing said fuel and air mixture into said combustion chamber and an electric spark producing system for creating a spark in said combustion chamber, said method comprising:

introducing combustion air in controlled amounts into said fuel introduction system, introducing said aqueous fuel into said fuel introduction system to mix with said combustion air, said fuel comprising water from about 20 percent to about 80 percent by volume of the total volume of said fuel, and a carbonaceous fuel, and introducing and combusting said aqueous fuel and combustion air in said combustion chamber in the presence of a hydrogen-producing catalyst to operate said engine, said combustion being initiated by a spark generated in said combustion chamber.

2. A method according to claim 1 wherein the combustion in the combustion chamber is initiated by a spark of at least 35000 volts.

3. A method according to claim 1 wherein the hydrogen-producing catalyst is present as at least one catalytic pole.

4. A method according to claim 3 wherein said hydrogen-producing catalyst is present as a plurality of catalytic electrically negative poles.

5. A method according to claim 1 wherein said carbonaceous fuel is selected from the group consisting of ethanol, methanol, gasoline, kerosene fuel, diesel fuel, other carbon-containing gaseous or liquid fuels, or mixtures thereof, in amounts of about 30% to about 60% of the total volume of said aqueous fuel.

6. A method according to claim 1 wherein the ratio of air to fuel in the mixture introduced into the combustion chamber(s) is not greater than 5:1.

7. A method according to claim 1 wherein the ratio of air to fuel in the mixture introduced into the combustion chamber(s) is 0.75:1 to 1.5:1.

8. A method according to claim 1 wherein said carbonaceous fuel is selected from the group consisting of ethanol, methanol or mixtures thereof.

9. A method according to claim 1 wherein said carbonaceous fuel consists essentially of gasoline.

10. A method according to claim 8 wherein the air to fuel ratio is about 1:1.

11. A method according to claim 9 wherein the air to fuel ratio is about 1:1.

12. A method according to claim 1 wherein said combustion air is initially heated prior to introduction to the combustion chamber by a heater and then heated by heat from hot exhaust gases from said engine after the engine is operating.

13. A The method according to claim 1 wherein said catalyst comprises at least one catalytic pole selected from the group consisting of nickel, platinum, platinum-nickel alloy, noble metals, alloys thereof, and other materials that will act as a catalyst for the dissociation of water molecules to produce hydrogen when said combustion air and said aqueous fuel are combusted in the presence of said catalyst and an electric spark.

14. A method according to claim 1 wherein said catalyst comprises at least one from the group consisting of Ni, Pt, Pt-Ni alloys, Ni-stainless steel, noble metals, Re, W, and alloys thereof.

15. A method according to claim 13 wherein said catalyst is platinum.

16. A method according to claim 13 wherein said catalyst comprises catalytic poles of one of nickel and nickel containing alloys.

17. A method according to claim 1 wherein said fuel introduction system includes a carburetor and said air is preheated to at least about 350° F. to about 400° F. as said air enters said carburetor.

18. A method according to claim 1 wherein said fuel introduction system includes a fuel injection system and said air is preheated from 122° F. to about 158° F. as said air enters said fuel injection system.

19. A method according to claim 1 wherein said aqueous fuel and combustion air are introduced into said fuel introduction system at ambient temperatures.

20. A method according to claim 1 wherein the power output of the engine is regulated by regulating the air flow into the fuel introduction system.

21. A method according to claim 1 wherein said engine comprises an engine from the group consisting of rotary engines, turbine engines and an engine with at least one working cylinders in which the process of combustion takes place within the cylinders.

22. A method for combusting an aqueous fuel in an internal combustion engine having: (a) at least one combustion chamber, (b) a fuel introduction system for receiving and mixing fuel and combustion air and introducing said fuel and air mixture into said combustion chamber and (c) an electric spark producing system for creating a spark in said combustion chamber, said method comprising:

introducing combustion air in controlled amounts into said fuel introduction system, introducing aqueous fuel into said fuel introduction system to mix with said combustion air, said aqueous fuel comprising water from about 20 percent to about 80 percent by volume of the total volume of said fuel, and a carbonaceous fuel selected from the group consisting of ethanol, methanol, gasoline, diesel fuel, kerosene fuel, other carbon-containing carbonaceous fuels, or mixtures thereof, and introducing and combusting said aqueous fuel and combustion air in said combustion chamber in the presence of a hydrogen-producing catalyst to operate said engine, said combustion being initiated by a spark generated in said combustion chamber.

23. A method according to claim 22 wherein the combustion in the chamber is initiated by a spark of at least 35000 volts.

24. A method according to claim 22 wherein the hydrogen-producing catalytic is present as at least one catalyst pole.

25. A method according to claim 24 wherein said hydrogen-producing catalyst is present as a plurality of catalytic electrically negative poles.

26. A method according to claim 22 wherein said aqueous fuel comprises 25% to 75% water.

27. A method according to claim 22 further comprising adjusting the air to fuel ratio of the fuel and air mixture introduced to the combustion chamber to be not greater than 5:1.

28. A method according to claim 22 wherein said catalyst is selected from the group consisting of nickel, platinum; platinum-nickel alloy, noble metals, alloys thereof, and other materials that will act as a catalyst for the dissociation of water molecules to produce hydrogen when said combustion air and said aqueous fuel are combusted in the presence of said catalyst and an electric spark.

29. A method according to claim 22 wherein water molecules in the aqueous fuel are dissociated in said combustion chamber to release hydrogen and oxygen and wherein said hydrogen is combusted in said combustion chamber along with carbonaceous fuel.

30. A method according to claim 22 wherein the power output of the engine is regulated by regulating the flow of air for combustion into the fuel introduction system.

31. A method according to claim 22 wherein said combustion air is initially heated prior to introduction to the combustion chamber by a heater and then heated by heat from hot exhaust gases from said engine after the engine is operating.

32. A method according to claim 22 wherein said fuel introduction system includes a carburetor and said air is preheated to at least about 350° F. to about 400° F. as said air enters said carburetor.

33. A method according to claim 22 wherein said fuel introduction system includes a fuel injection system and said air is preheated to at least 122° F. as said air enters said fuel injection system.

34. A method for combusting an aqueous fuel comprising a mixture of carbonaceous fuel and water in an internal combustion engine, said combustion being capable of producing approximately at least as much engine power as the same volume of said carbonaceous fuel would produce in said engine without water and a range of power output as indicated by a corresponding range of engine revolutions per minute (rpm); said engine having at least one combustion chamber, an electric spark producing system for creating a spark in said combustion chamber, and a fuel introduction system for (a) receiving and mixing fuel with air for combustion, (b) controlling the proportions of fuel and air, and (c) introducing said fuel and air mixture into said combustion chamber; said method comprising:

introducing aqueous fuel and controlled amounts of combustion air into said fuel introduction system for mixing therein, said aqueous fuel comprising water from about 20 percent to about 80 percent by volume of the total volume of said fuel and a liquid or gaseous carbonaceous fuel, introducing said mixture of aqueous fuel and combustion air into said combustion chamber in the presence of a hydrogen-producing catalyst in said combustion chamber; and combusting said aqueous fuel and air mixture to operate said engine, said combustion being initiated by a spark generated in said combustion chamber.

35. A method according to claim 34 wherein the combustion in the chamber is initiated by a spark of at least 35000 volts.

36. A method according to claim 34 wherein the hydrogen-producing catalyst is present as at least one catalytic pole.

37. A method according to claim 36 wherein said hydrogen-producing catalyst is present as a plurality of catalytic electrically negative poles.

38. A method according to claim 34 wherein said aqueous fuel comprises 25% to 75% water.

39. A method according to claim 38 wherein said air to fuel ratio is controlled to be not greater than 5:1.

40. A method according to claim 34 wherein water molecules in the aqueous fuel are dissociated in said combustion chamber to release hydrogen and oxygen and wherein said hydrogen is combusted in said combustion chamber along with carbonaceous fuel.

41. A method according to claim 34 wherein said carbonaceous fuel is selected from the group consisting of alcohols, gasoline, diesel fuel, kerosene fuel, and mixtures thereof, and the air to fuel ratio is controlled to be in the range of 0.75:1 to 1.5:1.

42. A method according to claim 34 wherein said hydrogen producing catalyst is selected from the group consisting of nickel, platinum, platinum-nickel, noble metals, alloys thereof, and other materials that will produce hydrogen when said combustion air and said aqueous fuel are combusted in the presence of said catalyst and an electrically generated spark.

43. A method according to claim 34 wherein said combustion air is initially heated by a heater and then heated by heat from hot exhaust gases from said engine after the engine is operating.

44. A method according to claim 34 wherein said fuel introduction system comprises a carburetor and said air is preheated to at least about 350° F. prior to entry into said carburetor.

45. A method according to claim 34 wherein said fuel introduction system comprises a fuel injection system said air is preheated at least about 122° F. prior to entry into said fuel injection system.

46. A method of operating an internal combustion engine in a motor vehicle, said internal combustion engine being capable of producing a range of power output as indicated by a corresponding range of engine revolutions per minute (rpm) and having at least one combustion chamber, an electric spark producing system for creating a spark in said combustion chamber, an da fuel introduction system for (a) receiving and mixing fuel with air, (b) controlling the proportions of fuel and air and (c) introducing said fuel and air mixture into said combustion chamber, said method comprising:

introducing combustion air in controlled amounts into said fuel introduction system, introducing aqueous fuel into said fuel introduction system to mix with said combustion air, said aqueous fuel comprising water from about 20 percent to about 80 percent by volume of the total volume of said fuel, and a liquid or gaseous carbonaceous fuel selected from the group consisting of alcohols, gasoline, diesel fuel or mixtures thereof, and introducing and combusting said aqueous fuel and combustion air in said combustion chamber in the presence of a hydrogen-producing catalyst to operate said engine, said combustion being initiated by a spark generated in said combustion chamber.

47. A method according to claim 46 wherein water molecules in the aqueous fuel are dissociated in said combustion chamber to release hydrogen and oxygen and wherein said hydrogen is combusted in said combustion chamber along with carbonaceous fuel.

48. A method according to claim 47 wherein the air to fuel ratio is controlled to be not greater than 5:1.

49. A method according to claim 47 wherein the amount of water in said aqueous fuel is 25% to 75% and the air to fuel ratio is controlled to be in the range of 0.75:1 to 1.5:1.

50. A method according to claim 47 wherein said hydrogen-producing catalyst comprises catalytic poles selected from the group consisting of nickel, platinum, platinum-nickel alloy, noble metals, alloys thereof, and other materials that will act as a catalyst for dissociation of water molecules to produce hydrogen when said combustion air and said aqueous fuel are combusted in the presence of said catalyst and an electric spark.

51. A method according to claim 50 wherein the combustion in the chamber is initiated by a spark of at least 35000 volts.

52. A method according to claim 50 wherein the hydrogen-producing catalyst is present as at least one catalytic pole.

53. A method according to claim 52 wherein said hydrogen-producing catalyst is present as a plurality of catalytic electrically negative poles.

54. A method according to claim 1, wherein said at least one hydrogen-producing catalytic pole is present in each combustion chamber.

55. A method according to claim 41, wherein the air to fuel ratio is controlled to be about 1:1.

56. A method according to claim 1, wherein said aqueous fuel additionally includes a wetting agent to assist in dispersing the carbonaceous fuel in water.

57. A method according to claim 56, wherein said wetting agent is a surfactant.

58. A method for combusting an aqueous fuel in an internal combustion engine having a plurality of combustion chambers, a fuel introduction system for receiving and mixing fuel and combustion air and introducing said fuel and air mixture into said combustion chambers and an electric spark producing system for creating a spark in said combustion chambers, said method comprising:

introducing combustion air in controlled amounts into said fuel introduction system, introducing said aqueous fuel into said fuel introduction system to mix with said combustion air, said fuel comprising water from about 20 percent to about 80 percent by volume of the total volume of said fuel, and a carbonaceous fuel, and introducing and combusting said aqueous fuel and combustion air in said combustion chambers in the presence of a hydrogen-producing catalyst to operate said engine, said combustion being initiated by a spark generated in said combustion chambers.

59. A method according to claim 58 wherein the combustion in the combustion chambers is initiated by a spark of at least 35000 volts.

60. A method according to claim 58 wherein the hydrogen-producing catalyst is present as at least one catalytic pole.

61. A method according to claim 60 wherein said hydrogen-producing catalyst is present as a plurality of catalytic electrically negative poles.

62. A method according to claim 58 wherein said carbonaceous fuel is selected from the group consisting of ethanol, methanol, gasoline, kerosene fuel, diesel fuel, other carbon-containing gaseous or liquid fuels, or mixtures thereof, in amounts of about 30% to about 60% of the total volume of said aqueous fuel.

63. A method according to claim 58 wherein the ratio of air to fuel in the mixture introduced into the combustion chambers is not greater than 5:1.

64. A method according to claim 58 wherein the ratio of air to fuel in the mixture introduced into the combustion chambers is 0.75:1 to 1.5:1.

65. A method according to claim 58 wherein said carbonaceous fuel is selected from the group consisting of ethanol, methanol or mixtures thereof.

66. A method according to claim 58 wherein said carbonaceous fuel consists essentially of gasoline.

67. A method according to claim 65 wherein the air to fuel ratio is about 1:1.

68. A method according to claim 66 wherein the air to fuel ratio is about 1:1.

69. A method according to claim 58 wherein said fuel introduction system includes a carburetor.

70. A method according to claim 58 wherein said fuel introduction system includes a fuel injection system.

71. A method according to claim 58 wherein said combustion air is initially heated prior to introduction to the combustion chambers by a heater and then heated by heat from hot exhaust gases from said engine after the engine is operating.

72. A method according to claim 58 wherein said catalyst comprises at least one catalytic pole selected from the group consisting of nickel, platinum, platinum-nickel alloy, noble metals, alloys thereof, and other materials that will act as a catalyst for the dissociation of water molecules to produce hydrogen when said combustion air and said aqueous fuel are combusted in the presence of said catalyst and an electric spark.

73. A method according to claim 58 wherein said catalyst comprises at least one from the group consisting of Ni, Pt, Pt-Ni alloys, Ni-stainless steel, noble metals, Re, W, and alloys thereof.

74. A method according to claim 72 wherein said catalyst is platinum.

75. A method according to claim 72 wherein said catalyst comprises catalytic poles of one of nickel and nickel containing alloys.

76. A method according to claim 58 wherein said fuel introduction system includes a carburetor and said air is preheated to at least about 350° F. to about 400° F. as said air enters said carburetor.

77. A method according to claim 58 wherein said fuel introduction system includes a fuel injection system and said air is preheated from 122° F. to about 158° F. as said air enters said fuel injection system.

78. A method according to claim 58 wherein said aqueous fuel and combustion air are introduced into said fuel introduction system at ambient temperatures.

79. A method according to claim 58 wherein the power output of the engine is regulated by regulating the air flow into the fuel introduction system.

80. A method according to claim 58 wherein said engine comprises an engine from the group consisting of rotary engines, turbine engines and an engine with at least one or more working cylinders in which the process of combustion takes place within the cylinders.

81. A method for combusting an aqueous fuel in an internal combustion engine having: (a) a plurality of combustion chambers, (b) a fuel introduction system for receiving and mixing fuel and combustion air and introducing said fuel and air mixture into said combustion chambers and (c) an electric spark producing system for creating a spark in said combustion chambers, said method comprising:

introducing combustion air in controlled amounts into said fuel introduction system, introducing aqueous fuel into said fuel introduction system to mix with said combustion air, said aqueous fuel comprising water from about 20 percent to about 80 percent by volume of the total volume of said fuel, and a carbonaceous fuel selected from the group consisting of ethanol, methanol, gasoline, diesel fuel, kerosene fuel, other carbon-containing carbonaceous fuels, or mixtures thereof, and introducing and combusting said aqueous fuel and combustion air in said combustion chambers in the presence of a hydrogen-producing catalyst to operate said engine, said combustion being initiated by a spark generated in said combustion chambers.

82. A method according to claim 81 wherein the combustion in the chambers is initiated by a spark of at least 35000 volts.

83. A method according to claim 81 wherein the hydrogen-producing catalyst is present as at least one catalytic pole.

84. A method according to claim 83 wherein said hydrogen-producing catalyst is present as a plurality of catalytic electrically negative poles.

85. A method according to claim 81 wherein said aqueous fuel comprises 25% to 75% water.

86. A method according to claim 81 further comprising adjusting the air to fuel ratio of the fuel and air mixture introduced to the combustion chambers to be not greater than 5:1.

87. A method according to claim 86 wherein the air to fuel ratio is 0.75:1 to 1.5:1.

88. A method according to claim 81 wherein said catalyst is selected from the class consisting of nickel, platinum, platinum-nickel alloy, noble metals, alloys thereof, and other materials that will act as a catalyst for the dissociation of water molecules to produce hydrogen when said combustion air and said aqueous fuel are combusted in the presence of said catalyst and an electric spark.

89. A method according to claim 81 wherein water molecules in the aqueous fuel are dissociated in said combustion chambers to release hydrogen and oxygen and wherein said hydrogen is combusted in said combustion chambers along with carbonaceous fuel.

90. A method according to claim 81 wherein the power output of the engine is regulated by regulating the flow of air for combustion into the fuel introduction system.

91. A method according to claim 81 wherein said combustion air is initially heated prior to introduction to the combustion chambers by a heater and then heated by heat from hot exhaust gases from said engine after the engine is operating.

92. A method according to claim 81 wherein said fuel introduction system includes a carburetor and said air is preheated to at least about 350° F. to about 400° F. as said air enters said carburetor.

93. A method according to claim 81 wherein said fuel introduction system includes a fuel injection system and said air is preheated to at least 122° F. as said air enters said fuel injection system.

94. A method for combusting an aqueous fuel comprising a mixture of carbonaceous fuel and water in an internal combustion engine, said combustion being capable of producing approximately at least as much engine power as the same volume of said carbonaceous fuel would produce in said engine without water and a range of power output as indicated by a corresponding range of engine revolutions per minute (rpm); said engine having a plurality of combustion chambers, an electric spark producing system for creating a spark in said combustion chambers, and a fuel introduction system for (a) receiving and mixing fuel with air for combustion, (b) controlling the proportions of fuel and air, and (c) introducing said fuel and air mixture into said combustion chambers; said method comprising:

introducing aqueous fuel and controlled amounts of combustion air into said fuel introduction system for mixing therein, said aqueous fuel comprising water from about 20 percent to about 80 percent by volume of the total volume of said fuel and a liquid or gaseous carbonaceous fuel, introducing said mixture of aqueous fuel and combustion air into said combustion chambers in the presence of a hydrogen-producing catalyst in said combustion chambers; and combusting said aqueous fuel and air mixture to operate said engine, said combustion being initiated by a spark generated in said combustion chambers.

95. A method according to claim 94 wherein the combustion in the chambers is initiated by a spark of at least 35000 volts.

96. A method according to claim 94 wherein the hydrogen-producing catalyst is present as at least one catalytic pole.

97. A method according to claim 96 wherein said hydrogen-producing catalyst is present as a plurality of catalytic electrically negative poles.

98. A method according to claim 94 wherein said aqueous fuel comprises 25% to 75% water.

99. A method according to claim 98 wherein said air to fuel ratio is controlled to be not greater than 5:1.

100. A method according to claim 94 wherein water molecules in the aqueous fuel are dissociated in said combustion chambers to release hydrogen and oxygen and wherein said hydrogen is combusted in said combustion chambers along with carbonaceous fuel.

101. The method according to claim 100 wherein said carbonaceous fuel is selected from the group consisting of alcohols, gasoline, diesel fuel, kerosene fuel, and mixtures thereof, and the air to fuel ratio is controlled to be in the range of 0.75:1 to 1.5:1.

102. The method according to claim 101 wherein said hydrogen producing catalyst is selected from the group consisting of nickel, platinum, platinum-nickel, noble metals, alloys thereof, and other materials that will produce hydrogen when said combustion air and said aqueous fuel are combusted in the presence of said catalyst and an electrically generated spark.

103. The method according to claim 94 wherein said combustion air is initially heated by a heater and then heated by heat from hot exhaust gases from said engine after the engine is operating.

104. The method according to claim 94 wherein said fuel introduction system comprises a carburetor and said air is preheated to at least about 350° F. prior to entry into said carburetor.

105. The method according to claim 94 wherein said fuel introduction system comprises a fuel injection system said air is preheated at least about 122° F. prior to entry into said fuel injection system.

106. A method of operating an internal combustion engine in a motor vehicle, said internal combustion engine being capable of producing a range of power output as indicated by a corresponding range of engine revolutions per minute (rpm) and having a plurality of combustion chambers, an electric spark producing system for creating a spark in said combustion chambers, and a fuel introduction system for (a) receiving and mixing fuel with air, (b) controlling the proportions of fuel and air and (c) introducing said fuel and air mixture into said combustion chambers, said method comprising:

introducing combustion air in controlled amounts into said fuel introduction system, introducing aqueous fuel into said fuel introduction system to mix with said combustion air, said aqueous fuel comprising water from about 20 percent to about 80 percent by volume of the total volume of said fuel, and a liquid or gaseous carbonaceous fuel selected from the group consisting of alcohols, gasoline, diesel fuel or mixtures thereof, and introducing and combusting said aqueous fuel and combustion air in said combustion chambers in the presence of a hydrogen-producing catalyst to operate said engine, said combustion being initiated by a spark generated in said combustion chambers.

107. A method according to claim 106 wherein water molecules in the aqueous fuel are dissociated in said combustion chambers to release hydrogen and oxygen and wherein said hydrogen is combusted in said combustion chambers along with carbonaceous fuel.

108. A method according to claim 107 wherein the air to fuel ratio is controlled to be not greater than 5:1.

109. A method according to claim 107 wherein the amount of water in said aqueous fuel is 25% to 75% and the air to fuel ratio is controlled to be in the range of 0.75:1 to 1.5:1.

110. A method according to claim 107 wherein said hydrogen-producing catalyst comprises catalytic poles selected from the group consisting of nickel, platinum, platinum-nickel alloy, noble metals, alloys thereof, and other materials that will act as a catalyst for dissociation of water molecules to produce hydrogen when said combustion air and said aqueous fuel are combusted in the presence of said catalyst and an electric spark.

111. A method according to claim 110 wherein the combustion in the chambers is initiated by a spark of at least 35000 volts.

112. A method according to claim 110 wherein the hydrogen-producing catalyst is present as at least one catalytic pole.

113. A method according to claim 110 wherein said hydrogen-producing catalyst is present as a plurality of catalytic electrically negative poles.

*114. A method for combusting an aqueous fuel in an internal combustion engine having at least one combustion chamber and a fuel introduction system for receiving and mixing fuel and combustion air and introducing said fuel and air mixture into said combustion chamber, said method comprising:*

*introducing combustion air in controlled amounts into said fuel introduction system,*

*introducing said aqueous fuel into said fuel introduction system to mix with said combustion air, said fuel comprising water from about 20 percent to about 80 percent by volume of the total volume of said fuel, and a carbonaceous fuel, and*

*introducing and combusting said aqueous fuel and combustion air in said combustion chamber in the presence of a hydrogen-producing catalyst to operate said engine, said combustion being initiated in said combustion chamber.*

*115. A method according to claim 114 wherein said carbonaceous fuel comprises diesel fuel, in amounts of about 30% to about 60% of the total volume of said aqueous fuel and said internal combustion engine is a diesel engine.*

*116. A method according to claim 115 wherein the power output of the engine is regulated by regulating the air and fuel flow into the fuel introduction system.*

*117. A method according to claim 114 wherein said carbonaceous fuel comprises diesel fuel and said internal combustion engine is a diesel engine.*

* * * * *

UNITED STATES PATENT AND TRADEMARK OFFICE

CERTIFICATE OF CORRECTION

PATENT NO. : Re. 35,237

DATED : May 14, 1996

INVENTOR(S) : Rudolf W. Gunnerman

It is certified that error appears in the above-indentified patent and that said Letters Patent is hereby corrected as shown below:

On the title page, Item 63, U.S. Applications,
change "Apr. 3, 1991" to -- Apr. 23, 1991 --;
change "Nov. 2, 1989" to -- Nov. 22, 1989 --;
and after "1989, abandoned" insert
-- , and related to 714,683, filed
Jun. 13, 1991, abandoned --.

Column 1, line 13, change "Apr. 3, 1991" to
-- Apr. 23, 1991 --.
Column 1, line 15, change "Nov. 2, 1989" to
-- Nov. 22, 1989 --.
Column 1, line 16, after "Jun. 13, 1991" insert
-- , abandoned --.
Column 1, line 67, change "Will" to -- will --.
Column 2, line 26, change "122°F.to" to -- 122°F. to --.
Column 3, lines 9,10, change "ratio of 14 to 16 1" to
-- ratio of 14 to 16:1 --.
Column 4, lines 7,8, delete "and oxygen"
(second occurrence).
Column 4, line 24, after "fuel is" change "need" to
-- needed --.
Column 6, line 28, change "Displaoement" to
-- Displacement --.
Column 6, line 39, after "loading." delete the parenthesis.
Column 6, line 65, change "3/4 inches" to -- 3/4 inch --.
Column 7, line 54, after "ethanol" change the period to a
comma.
Column 8, lines 44,45, after "help" change "reducing" to
-- reduce --.
Column 9, line 23, change "pumped" to -- pump --.
Column 9, line 59, after "tank" delete "this fuel".

UNITED STATES PATENT AND TRADEMARK OFFICE

CERTIFICATE OF CORRECTION

PATENT NO. : Re. 35,237

DATED : May 14, 1996

INVENTOR(S) : Rudolf W. Gunnerman

It is certified that error appears in the above-indentified patent and that said Letters Patent is hereby corrected as shown below:

Column 11, line 21, change "examples" to -- example --.
Column 11, line 29, after "followed" delete "with".
Column 11, line 60, after "mixtures" replace "where" with -- were --.
Column 14, line 22, after "working" replace "cylinders" with -- cylinder --.
Column 16, line 19, change "system said" to -- system and said --.
Column 16, line 27, change "an da" to -- and a --.
Column 20, line 39, change "system said" to -- system and said --.
Column 20, line 40, after "preheated" insert -- to --.

Signed and Sealed this

Fifteenth Day of December, 1998

Bruce Lehman

*Attest:*

BRUCE LEHMAN

*Attesting Officer*

*Commissioner of Patents and Trademarks*